United States Patent
Takahashi et al.

(10) Patent No.: US 8,268,485 B2
(45) Date of Patent: Sep. 18, 2012

(54) NONAQUEOUS ELECTROLYTE SECONDARY BATTERY

(75) Inventors: Yasufumi Takahashi, Kobe (JP); Hiroyuki Fujimoto, Kobe (JP); Akira Kinoshita, Kobe (JP); Shingo Tode, Kobe (JP); Ikuro Nakane, Kobe (JP); Shin Fujitani, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 1167 days.

(21) Appl. No.: 10/563,126

(22) PCT Filed: Aug. 30, 2004

(86) PCT No.: PCT/JP2004/012463
§ 371 (c)(1),
(2), (4) Date: Jan. 3, 2006

(87) PCT Pub. No.: WO2005/027243
PCT Pub. Date: Mar. 24, 2005

(65) Prior Publication Data
US 2006/0166100 A1    Jul. 27, 2006

(30) Foreign Application Priority Data
Sep. 9, 2003  (JP) .................... 2003-317456

(51) Int. Cl.
*H01M 4/62*  (2006.01)
*H01M 4/58*  (2010.01)
*H01M 4/52*  (2010.01)

(52) U.S. Cl. ............. 429/231.3; 429/231.8; 429/232; 429/338

(58) Field of Classification Search .............. None
See application file for complete search history.

(56) References Cited

U.S. PATENT DOCUMENTS 5,030,528 A * 7/1991 Shen et al. ................ 429/330
5,783,333 A * 7/1998 Mayer ....................... 429/223
2004/0121234 A1  6/2004 Le ......................... 429/231.1

FOREIGN PATENT DOCUMENTS

| CA | 2510651 | | 2/2005 |
|---|---|---|---|
| CN | 1492527 A | * | 4/2004 |
| JP | 3-201368 A | | 9/1991 |
| JP | 4-319260 A | | 11/1992 |
| JP | 2855877 B2 | | 11/1998 |
| JP | 2001-68167 A | | 3/2001 |
| JP | 2002-358963 A | | 12/2002 |
| JP | 2002358963 A | * | 12/2002 |
| JP | 2003-176115 A | | 6/2003 |
| JP | 2003-217585 A | | 7/2003 |
| JP | 2003/221234 A | | 8/2003 |
| JP | 2004-175609 A | | 6/2004 |
| JP | 2004-200101 A | | 7/2004 |
| JP | 2004/311408 A | | 11/2004 |
| WO | 03/069702 A1 | | 8/2003 |
| WO | 2005/011044 | | 2/2005 |

OTHER PUBLICATIONS

Zumdahl, Steven, Chemical Principles, 1995, D.C. Heath and Company, second edition, pp. 67-70.*
Communication dated Jul. 3, 2009, in a corresponding European patent application.

* cited by examiner

*Primary Examiner* — Robert Hodge
(74) *Attorney, Agent, or Firm* — Kubovcik & Kubovcik

(57) ABSTRACT

A nonaqueous electrolyte secondary battery which has a positive electrode containing lithium cobalt oxide as a positive active material, a negative electrode containing a graphite material and a nonaqueous electrolyte solution containing ethylene carbonate as a solvent and which is charged with an end-of-charge voltage of at least 4.3 V. Characteristically, the battery uses, as the positive active material, lithium cobalt oxide obtained by firing a mixture of a lithium salt, tricobalt tetraoxide ($Co_3O_4$) and a zirconium compound and having particle surfaces onto which the zirconium compound adheres.

6 Claims, 2 Drawing Sheets

[FIG. 1]
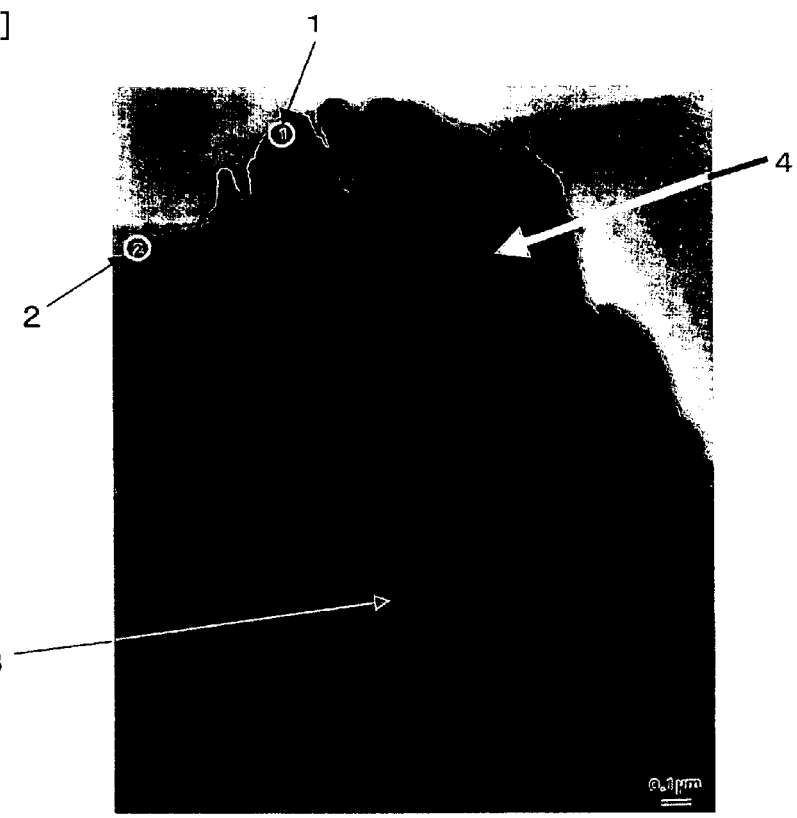
[FIG. 2]
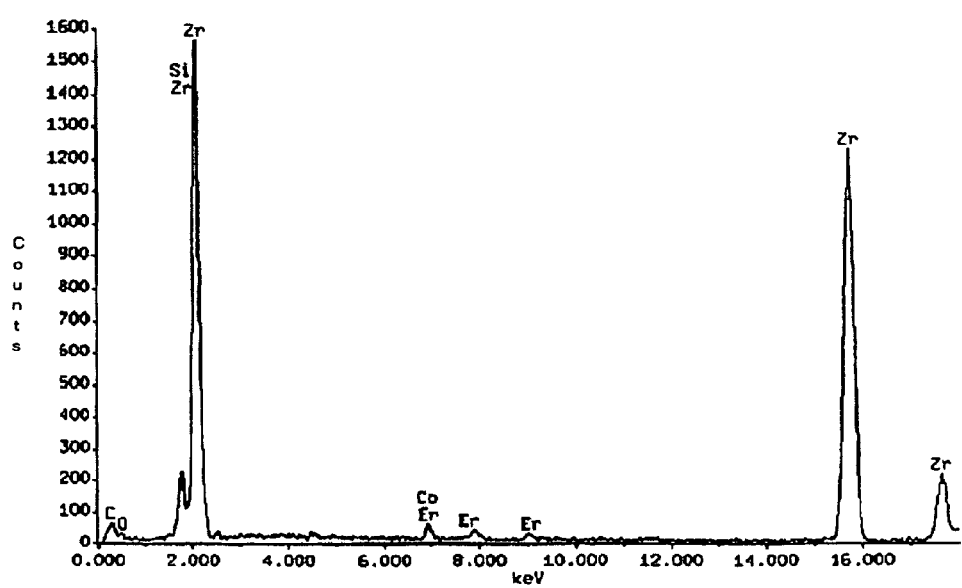

[FIG. 3]
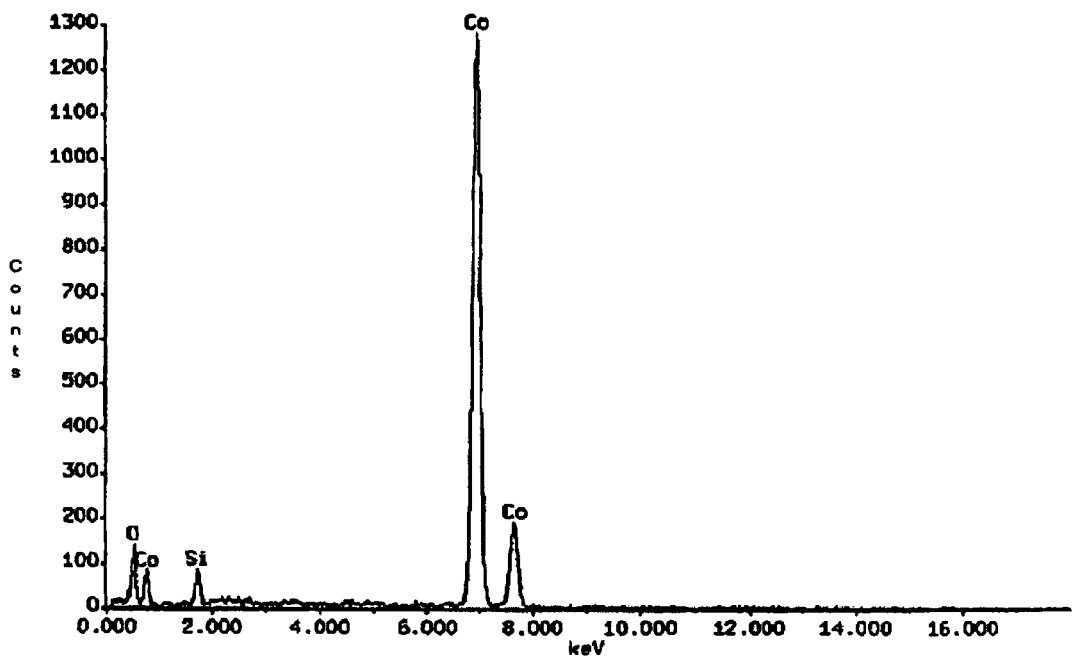
[FIG. 4]
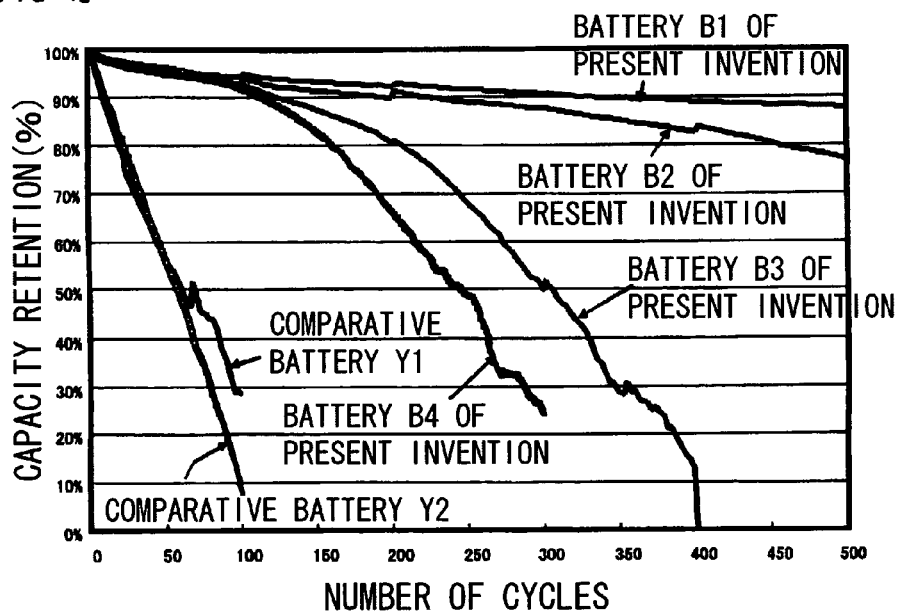

NONAQUEOUS ELECTROLYTE SECONDARY BATTERY

This application is a 371 of international application PCT/JP2004/012463, which claims priority based on Japanese patent application No. 2003-317456 filed Sep. 9, 2003, which is incorporated herein by reference.

TECHNICAL FIELD

The present invention relates to a nonaqueous electrolyte secondary battery.

BACKGROUND ART

In recent years, nonaqueous electrolyte secondary batteries using metallic lithium, an alloy capable of storing and releasing lithium or a carbon material as the negative active material and a lithium transition metal complex oxide represented by the chemical formula: $LiMO_2$ (M indicates a transition metal) as the positive active material have been noted as high-energy-density batteries.

A representing example of the lithium transition metal complex oxide is lithium cobalt oxide ($LiCoO_2$), which has been already put to practical use as the positive active material for nonaqueous electrolyte secondary batteries. However, in the case where lithium cobalt oxide is used alone, batteries show capacity reduction during charge-discharge cycles, due to structural degradation of lithium cobalt oxide or decomposition of an electrolyte solution on a surface of a positive electrode.

An attempt has been made to improve such capacity reduction by substituting a metal for a part of cobalt. In Patent Literature 1, substitution of tungsten, manganese, tantalum, titanium or niobium for a part of cobalt has been studied. A further attempt has been made which incorporates an element, other than cobalt, in a positive electrode. In Patent Literature 2, addition of zirconium to lithium cobalt oxide has been studied.

However, the nonaqueous electrolyte secondary battery disclosed in Patent Literature 1 shows deteriorated charge-discharge cycle characteristics when its end-of-charge voltage is prescribed at 4.3 V or above, which has been a problem.

For nonaqueous electrolyte secondary batteries using a lithium transition metal oxide, such as lithium cobalt oxide, as the positive active material and a graphite material or the like as the negative active material, an end-of-charge voltage is generally prescribed at 4.1-4.2 V. In this case, the active material of the positive electrode utilizes only 50-60% of its theoretical capacity. Accordingly, if the end-of-charge voltage is increased to a higher level, a capacity (utilization factor) of the positive electrode can be improved to increase the battery capacity and energy density. However, a deeper depth of charge of the positive electrode, as a result of the increase of the end-of-charge voltage of the battery, increases a tendency of an electrolyte solution to decompose on a surface of the positive electrode and renders the positive active material more prone to experience structural degradation. As a result, more significant deterioration occurs during charge-discharge cycles, compared to the conventional case where the end-of-charge voltage was prescribed at 4.1-4.2 V.

In the nonaqueous electrolyte secondary battery disclosed in Patent Literature 2, an attempt to improve its charge-discharge cycle characteristics has been made by heat treating a mixture of a lithium salt, cobalt carbonate ($CoCO_3$) and a zirconium compound to cover a surface of lithium cobalt oxide as by a zirconium oxide ($ZrO_2$) so that decomposition of an electrolyte solution on a surface of the positive electrode is retarded and degradation of crystal structure of the active material of the positive electrode is suppressed.

However, in the nonaqueous electrolyte secondary battery manufactured by the method disclosed in Patent Literature 2, a surface of lithium cobalt oxide is covered with a non-ion-conducting zirconium compound ($ZrO_2$ or $Li_2ZrO_3$). This deteriorates charge-discharge characteristics of the positive active material itself and accordingly of the battery, which has been a problem.

Patent Literature 1: Japanese Patent Laying-Open No. Hei 3-201368

Patent Literature 2: Japanese Patent Registration No. 2855877

DISCLOSURE OF THE INVENTION

It is an object of the present invention to provide a nonaqueous electrolyte secondary battery which can solve the above-described problems, which uses lithium cobalt oxide as the positive active material and a graphite material as the negative active material and which can be operated at an end-of-charge voltage of 4.3 V or above, without deterioration of charge-discharge cycle characteristics, so that a charge-discharge capacity can be increased.

The present invention provides a nonaqueous electrolyte secondary battery which has a positive electrode containing lithium cobalt oxide as a positive active material, a negative electrode containing a graphite material and a nonaqueous electrolyte solution containing ethylene carbonate as a solvent and which is charged with an end voltage of at least 4.3 V, the battery being characterized in that a zirconium compound adheres onto particle surfaces of the lithium cobalt oxide. In the present invention, the zirconium compound is described as adhering onto a particle surface of lithium cobalt oxide when at least 80% of the particle surface of lithium cobalt oxide is left uncovered.

The present invention also provides a nonaqueous electrolyte secondary battery which has a positive electrode containing lithium cobalt oxide as a positive active material, a negative electrode containing a graphite material and a nonaqueous electrolyte solution containing ethylene carbonate as a solvent and which is designed to be charged with an end voltage of at least 4.3 V, the battery being characterized in that the positive active material is a product obtained by firing a mixture of a lithium salt, tricobalt tetraoxide ($Co_3O_4$) and a zirconium compound, and the zirconium-containing compound adheres onto particle surfaces of the lithium cobalt oxide.

The use of the above-specified positive active material, in accordance with the present invention, enables the battery to be charged and discharged without deterioration of its charge-discharge cycle characteristics, even when an end-of-charge voltage is prescribed at 4.3 V or above. As a result, a charge-discharge capacity can be increased to a higher level than conventional.

This is probably because the use of the positive active material comprising lithium cobalt oxide in the form of particles having a surface onto which a zirconium compound adheres suppresses an oxidation reaction of the electrolyte solution on a surface of the active material.

In the present invention, at least 80% of a particle surface of lithium cobalt oxide is left uncovered for contact with the electrolyte solution. Further, the zirconium compound adheres onto particle surfaces of lithium cobalt oxide. Although the reason is not clarified, the combination thereof presumably acts to lower a surface activity of lithium cobalt oxide and thereby suppresses an oxidation reaction of the electrolyte solution on a surface of the active material at a high potential.

It is also preferred in the present invention that a mixture of a lithium salt, tricobalt tetraoxide and a zirconium compound is used as a starting material and is fired at a temperature of below 900° C. but not below 700° C.

In order to obtain lithium cobalt oxide that exhibits a sufficient charge-discharge capacity, firing is preferably performed at a temperature of not below 700° C. In order to prevent diffusion of zirconium into lithium cobalt oxide, firing is preferably performed at a temperature of below 900° C.

Also in the present invention, when the end-of-charge voltage is prescribed at 4.4 V, a ratio in charge capacity of the negative electrode to the positive electrode (negative electrode/positive electrode) in their portions opposed to each other is preferably in the range of 1.0-1.2. In the present invention wherein the battery is charged at a voltage of at least 4.3 V, the ratio in charge capacity of the negative to positive electrode when the end-of-charge voltage is 4.4 V is preferably preset at 1.0 or above. This restrains deposition of metallic lithium on a surface of the negative electrode. As a result, cycle characteristics and safety level of the battery can be improved.

Also in the present invention, a solvent in the nonaqueous electrolyte solution preferably contains 10-20% by volume of ethylene carbonate (EC).

Because a graphite material is used for the negative electrode, the excessively small ethylene carbonate content may prevent charge-discharge cycling of the battery. On the other hand, the excessively large ethylene carbonate content promotes oxidative decomposition of the positive active material at a high potential, so that a degradation degree of the positive active material increases.

In the present invention, a nonaqueous electrolyte solvent for use in combination with ethylene carbonate (EC) can be selected from those conventionally used as electrolyte solvents for lithium secondary batteries. Particularly, a mixed solvent of ethylene carbonate and a chain carbonate and a mixed solvent of ethylene carbonate, a chain carbonate and a cyclic carbonate are preferably used. Examples of chain carbonates include dimethyl carbonate (DMC), methyl ethyl carbonate (MEC) and diethyl carbonate (DEC). Examples of cyclic carbonates include propylene carbonate (PC), butylene carbonate (BC) and vinylene carbonate (VC).

A nonaqueous electrolyte solute useful in the present invention is a lithium salt which is generally used as a solute for lithium secondary batteries. Particularly, $LiPF_6$ (lithium hexafluorophosphate) is preferably used. Charging at a higher voltage increases a tendency of aluminum, which is a positive current collector, to dissolve. However, $LiPF_6$, if present, decomposes to form a film on a surface of aluminum. This film restrains dissolution of aluminum. Accordingly, $LiPF_6$ is preferably used as the lithium salt.

Also in the present invention, zirconium is preferably contained in the positive active material in the amount of less than 1 mole % but not less than 0.1 mole %, based on the total mole of cobalt and zirconium.

If the amount of zirconium is less than 0.1 mole %, a coverage of the zirconium compound decreases to result in the difficulty to lower a surface activity of lithium cobalt oxide and suppress an oxidation reaction of the electrolyte solution on a surface of the active material. On the other hand, if the amount of zirconium is not less than 1 mole %, a coverage of the zirconium compound increases to reduce the surface area of lithium cobalt oxide that is left uncovered for contact with the electrolyte solution and accordingly deteriorate discharge characteristics of the battery.

In the present invention, a particle diameter of the zirconium compound adhered onto a surface of lithium cobalt oxide is preferably from 100 nm to 3 μm.

If the particle diameter of the zirconium compound falls below 100 nm, diffusion of zirconium into lithium cobalt oxide may occur or the coverage of the zirconium compound may become excessively large to result in the deteriorated discharge characteristics. If the particle diameter of the zirconium compound exceeds 3 μm, the zirconium-containing compound may fail to disperse uniformly in the active material before it adheres. As a result, a sufficient effect can not be obtained.

The present invention further provides a method for manufacturing a nonaqueous electrolyte secondary battery which includes a positive electrode containing, as a positive active material, lithium cobalt oxide in the form of particles having a surface onto which a zirconium compound adheres, a negative electrode containing a graphite material and a nonaqueous electrolyte solution containing ethylene carbonate as a solvent and which is charged with an end voltage of at least 4.3 V. Characteristically, the positive active material is obtained by firing a mixture of a lithium salt, tricobalt tetraoxide ($Co_3O_4$) and a zirconium compound at a temperature of below 900° C. but not below 700° C.

Further, the method of the present invention for manufacture of a nonaqueous electrolyte secondary battery is characterized in that zirconium is contained in the positive active material in the amount of less than 1 mole % but not less than 0.1 mole %, based on the total mole of cobalt and zirconium.

In the method of this invention for manufacturing a nonaqueous electrolyte secondary battery, tricobalt tetra-oxide ($Co_3O_4$) is used as a starting material to synthesize the positive active material comprising lithium cobalt oxide in the form of particles having a surface onto which a zirconium compound adheres. Since an oxidation number (2.7-valent) of Co in $Co_3O_4$ is close to an oxidation number (3-valent) of Co in lithium cobalt oxide, a reaction is believed to occur during synthesis of the positive active material, whereby lithium in the lithium compound as a starting material diffuses into $Co_3O_4$. This allows tricobalt tetraoxide to retain its shape and enable production of lithium cobalt oxide. Therefore, the zirconium compound is prevented from covering lithium cobalt oxide, entering into a solid solution in lithium cobalt oxide or diffusing into lithium cobalt oxide. As a result, lithium cobalt oxide can be obtained in the form of particles having a surface onto which the zirconium compound adheres and at least 80% of which is left uncovered.

On the other hand, if a cobalt compound containing Co with an oxidation number of 2, such as $CoCO_3$ or Co $(OH)_2$, is used as a starting material for the positive active material, thermal decomposition occurs during synthesis of the positive active material, whereby the cobalt compound releases $CO_2$ and $H_2O$ to produce CoO. Subsequent diffusion of lithium from the lithium compound into CoO containing Co with an oxidation number of 2 results in the production of lithium cobalt oxide in which cobalt has an oxidation number of 3. Such thermal decomposition of the raw material is believed to cause the zirconium compound to enter into a solid solution in lithium cobalt oxide, diffuse into lithium cobalt oxide or cover lithium cobalt oxide.

Also in the present invention, a charge voltage of the battery is preferably 4.3V-4.4 V, because an end-of-charge voltage, if prescribed at 4.5 V or above, increases an influence by degradation of crystal structure of lithium cobalt oxide.

In accordance with the present invention, an end-of-charge voltage can be increased to 4.3 V or above without deterioration of charge-discharge cycle characteristics, whereby a charge-discharge capacity can be increased.

BRIEF DESCRIPTION OF THE DRAWINGS

FIG. 1 is a photomicrograph taken using a transmission electron microscope, showing the positive active material prepared in Example 1-1.

FIG. 2 is a chart showing an EDS spectrum for Spot 1 in FIG. 1.

FIG. 3 is a chart showing an EDS spectrum for Spot 2 in FIG. 1.

FIG. 4 is a graph showing charge-discharge cycle characteristics of the battery in accordance with the present invention.

EXPLANATION OF REFERENCE NUMERALS

1 ... Spot 1
2 ... Spot 2
3 ... lithium cobalt oxide ($LiCoO_2$)
4 ... zirconium (Zr) compound

BEST MODE FOR CARRYING OUT THE INVENTION

The present invention is below described in more detail by way of Examples. It will be recognized that the following examples merely illustrate the present invention and are not intended to be limiting thereof. Suitable changes can be effected without departing from the scope of the present invention.

EXPERIMENT 1

In Experiment 1, a mixture containing a lithium compound, tricobalt tetraoxide ($Co_3O_4$) and a zirconium compound was fired to obtain a product for use as a positive active material. Using this positive active material, the battery was charged and discharged with end-of-charge voltages of 4.2 V and 4.4 V to study resulting cycle characteristics and the superiority of the nonaqueous electrolyte secondary battery of the present invention when its end-of-charge voltage was prescribed at a high level. Specifically, batteries A1 and A2 of the present invention in the following Examples 1-1 and 1-2, as examples of the present invention, as well as a comparative battery X1 as a comparative example, were constructed and evaluated.

EXAMPLE 1-1

[Preparation of Positive Active Material]

$Li_2CO_3$ (lithium salt), tricobalt tetraoxide ($Co_3O_4$) and $ZrO_2$ (zirconium compound) were mixed in an Ishikawa automated mortar such that a molar ratio Li:Co:Zr was brought to 1:0.995:0.005, heat treated in the air atmosphere at 850° C. for 20 hours and then pulverized to obtain a lithium-containing transition metal complex oxide having a mean particle diameter of 14.0 μm. Its BET specific surface area was 0.38 $m^2/g$. A TEM (transmission electron microscope) photograph of the obtained active material is shown in FIG. 1. Also, the metal elements (Co and Zr) contained in the two locations (Spot 1 and Spot 2) shown in the TEM photograph of FIG. 1 were qualitatively evaluated by EDS (energy dispersive spectroscopy). Their EDS spectra are shown in FIGS. 2 and 3.

From FIGS. 1-3, a 1-2μm compound containing zirconium (Zr) has been found as adhering onto a surface of lithium cobalt oxide ($LiCoO_2$) as the positive active material. The compound containing zirconium (Zr) has been observed as existing in the form of particles adhered onto several surface portions of a $LiCoO_2$ particle. Because the positive active material has a particle diameter of 14.0 μm, at least 80% of a surface of $LiCoO_2$ turns out to be left uncovered.

As apparent from FIGS. 2 and 3, little Co was detected in Spot 1, while no Zr was detected in Spot 2. This demonstrates that Zr does not form a solid solution with $LiCoO_2$ but exists (adheres) independently in the form of zirconium compound particles.

[Fabrication of Positive Electrode]

The above-prepared positive active material, carbon as an electrical conductor and polyvinylidene fluoride as a binder at a ratio by weight of 90:5:5, were added to N-methyl-2-pyrrolidone as a dispersing medium. The mixture was kneaded to prepare a cathode mix slurry. The prepared slurry was coated on an aluminum foil as a current collector, dried and then rolled by a pressure roll. Subsequent attachment of a current collecting tab completed fabrication of a positive electrode.

[Fabrication of Negative Electrode]

Synthetic graphite (graphite material) and a styrene-butadiene rubber as a binder were added to an aqueous solution of carboxymethylcellulose as a thickener so that the mixture contained the synthetic graphite, binder and thickener in the ratio by weight of 95:3:2. The mixture was then kneaded to prepare an anode mix slurry. The prepared slurry was coated onto a copper foil as a current collector, dried and rolled by a pressure roll. Subsequent attachment of a current collecting tab completed fabrication of a negative electrode.

[Preparation of Electrolyte Solution]

Ethylene carbonate (EC) and diethyl carbonate (DEC) were mixed at a 1:9 ratio by volume to provide a mixed solvent in which lithium hexafluorophosphate ($LiPF_6$) was subsequently dissolved in the concentration of 1 mole/liter to prepare an electrolyte solution.

[Construction of Battery]

The above-obtained positive and negative electrodes were wound, while interposing a separator between them, to provide a wound assembly. In a glove box maintained under Ar atmosphere, the wound assembly and electrolyte solution were encapsulated in a casing of an aluminum laminate to construct a nonaqueous electrolyte secondary battery A1 of the present invention which measured 3.6 mm in thickness, 3.5 cm in width and 6.2 cm in length. When the battery A1 of the present invention was charged at a voltage of 4.4 V, a ratio in charge capacity of the negative electrode to the positive electrode in their portions opposed to each other was brought to 1.15.

EXAMPLE 1-2

The procedure of Example 1-1 was followed, except that ethylene carbonate (EC) and diethyl carbonate (DEC) were mixed at a 3:7 ratio by volume, to construct a battery A2 of the present invention.

COMPARATIVE EXAMPLE 1-1

In Preparation of Positive Active Material, $Li_2CO_3$ and $Co_3O_4$ were mixed such that a molar ratio Li:Co was brought to 1:1. Otherwise, the procedure of Example 1-1 was followed to construct a comparative battery X1. The obtained positive active material had a mean particle diameter of 11.0 μm and a BET specific surface area of 0.33 $m^2/g$.

[Evaluation of Cycle Characteristics]

Each of the batteries A1 and A2 of the present invention and the comparative battery X1 was charged at a constant current of 650 mA to a voltage of 4.2 V or 4.4 V, further charged at the constant voltage to a current value of 32 mA, and then discharged at a constant current of 650 mA to a voltage of 2.75 V to measure a discharge capacity (mAh). This unit cycle was repeated to conduct a charge-discharge cycle test. For each battery, a capacity retention after 300 cycles is shown in Table 1. Capacity retention was calculated from discharge capacity after cycles/1st-cycle discharge capacity×100 (%). The 5 battery obtained in Comparative Example 1-1, when charged at a voltage of 4.4 V, showed marked deterioration in capacity with the increasing number of cycles and accordingly its cycle test was discontinued after 100 cycles. The comparative battery X2 exhibited a capacity retention of 28.5% on the 100th cycle.

TABLE 1

| | Zr Content of Positive Active Material (mole %) | EC Content of Electrolyte Solvent (VOL. %) | Capacity Retention (%) after 300 Cycles | |
|---|---|---|---|---|
| | | | End-of-Charge Voltage 4.2 V | End-of-Charge Voltage 4.4 V |
| Battery A1 of Present Invention | 0.5 | 10 | 91.8 | 91.0 |
| Battery A2 of Present Invention | 0.5 | 30 | 93.4 | 49.9 |
| Comparative Battery X1 | 0 | 30 | 89.3 | — |

As can be seen from Table 1, the batteries A1 and A2 of the present invention and the comparative battery X1 all exhibited high capacity retention values of at least 89.3% after 300 cycles, when charged and discharged with an end-of-charge voltage of 4.2 V. With the end-of-charge voltage of 4.4 V, the batteries A1 and A2 of the present invention are capable of 300 charge-discharge cycles, while the comparative battery X1 is incapable of 300 charge-discharge cycles. This proves that the improved charge-discharge cycle characteristics are obtained for the batteries in accordance with the present invention.

The batteries A1 and A2 of the present invention use, as the positive active material, lithium cobalt oxide in the form of particles having a surface onto which a zirconium compound adheres and at least 80% of which is left uncovered for contact with an electrolyte solution. This configuration is believed to have restrained an oxidation reaction of the electrolyte solution on the surface of the active material and prevented marked deterioration of cycle characteristics even when those batteries were charged and recharged with the end-of-charge voltage of 4.4 V.

In particular, a high capacity retention of 91.0% was obtained after 300 cycles for the battery A2 of the present invention using an electrolyte solution having an EC content by volume of 10%.

EXPERIMENT 2

In Experiment 2, a mixture containing a lithium compound, tricobalt tetraoxide ($Co_3O_4$) and a zirconium compound was fired to obtain a product for use as a positive active material. Using this positive active material, batteries were charged and discharged with an end-of-charge voltage of 4.4 V, while an ethylene carbonate (EC) content of an electrolyte solvent was varied between them, to study resulting cycle characteristics and investigate the dependence of cycle characteristics of the battery of the present battery upon the ethylene carbonate content of an electrolyte solvent. Also, a zirconium content of the positive active material was varied to study resulting cycle characteristics and investigate the dependence of cycle characteristics of the battery of the present invention upon the zirconium content of the positive active material. In specific, batteries B1-B4 of the present invention in the following Examples 2-1-2-4 as examples of the present invention, as well as comparative batteries Y1 and Y2 as comparative examples, were constructed and evaluated.

EXAMPLE 2-1

In Preparation of Electrolyte Solution, ethylene carbonate (EC) and diethyl carbonate (DEC) were mixed at a 1:9 ratio by volume. The procedure of Example 1-1 was followed to construct a nonaqueous electrolyte secondary battery B1, which was then evaluated for charge-discharge cycle characteristics. This battery is identical in construction to the battery A1 of the present invention.

EXAMPLE 2-2

In Preparation of Electrolyte Solution, ethylene carbonate (EC) and diethyl carbonate (DEC) were mixed at a 2:8 ratio by volume. Otherwise, the procedure of Example 1-1 was followed to construct a nonaqueous electrolyte secondary battery B2 which was then evaluated for charge-discharge cycle characteristics.

EXAMPLE 2-3

In Preparation of Electrolyte Solution, ethylene carbonate (EC) and diethyl carbonate (DEC) were mixed at a 3:7 ratio by volume. Otherwise, the procedure of Example 1-1 was followed to construct a battery B3 of the present invention. This battery is identical in construction to the battery A2 of the present invention.

EXAMPLE 2-4

In Preparation of Positive Active Material, $Li_2CO_3$, $Co_3O_4$ and $ZrO_2$ were mixed such that a molar ratio Li:Co:Zr was brought to 1:0.99:0.01. Otherwise, the procedure of Example 1-1 was followed to construct a battery B4 of the present invention. The obtained positive active material had a mean particle diameter of 13.8 μm and a BET specific surface area of 0.43 $m^2/g$.

COMPARATIVE EXAMPLE 2-1

In Preparation of Electrolyte Solution, ethylene carbonate (EC) and diethyl carbonate (DEC) were mixed at a 3:7 ratio by volume. The procedure of Comparative Example 1-1 was followed to construct a comparative battery Y1. This battery is identical in construction to the comparative battery X1.

COMPARATIVE EXAMPLE 2-2

In Preparation of Electrolyte Solution, ethylene carbonate (EC) and diethyl carbonate (DEC) were mixed at a 1:9 ratio by volume. Otherwise, the procedure of Comparative Example 1-1 was followed to construct a comparative battery Y2.

[Evaluation of Cycle Characteristics]

As similar to Example 1, each of the batteries B1-B4 of the present invention and the comparative batteries Y1 and Y2 was subjected to a charge-discharge cycle test with an end-of-charge voltage of 4.4 V. Capacity retention values after 100, 300 and 500 cycles are shown in Table 2. Charge-discharge cycle characteristics for each battery are shown in FIG. 4. The batteries obtained in Comparative Examples 2-1 and 2-2 showed marked deterioration in capacity with the increasing number of cycles and accordingly their cycle tests were discontinued after 100 cycles. For the batteries obtained in Examples 2-3 and 2-4, the cycle test was discontinued after 300 cycles.

TABLE 2

|  | Zr Content (mole %) | EC Content of Electrolyte Solvent (VOL. %) | Capacity Retention (%) | | |
| --- | --- | --- | --- | --- | --- |
|  |  |  | after 100 Cycles | after 300 Cycles | after 500 Cycles |
| Battery B1 (A1) of Present Invention | 0.5 | 10 | 94.6% | 91.0% | 87.9% |
| Battery B2 of Present Invention | 0.5 | 20 | 93.2% | 87.8% | 77.2% |
| Battery B3 (A2) of Present Invention | 0.5 | 30 | 92.4% | 49.9% | — |
| Battery B4 of Present Invention | 1.0 | 30 | 92.0% | 24.7% | — |
| Comparative Battery Y1 (X1) | 0 | 30 | 28.5% | — | — |
| Comparative Battery Y2 | 0 | 10 | 7.8% | — | — |

As can be seen from Table 2 and FIG. 4, with the end-of-charge voltage of 4.4 V, the batteries B1-B4 of the present invention are capable of at least 300 charge-discharge cycles, while the comparative batteries Y1 and Y2 are capable of only 100 charge-discharge cycles. This demonstrates that the batteries B1-B4 of the present invention exhibit improved charge-discharge cycle characteristics over the comparative batteries Y1 and Y2.

It has been also found that the batteries B1 and B2 of the present invention, incorporating an electrolyte solvent containing 10-20% by volume of ethylene carbonate (EC), are capable of 500 charge-discharge cycles and exhibit particularly improved charge-discharge cycle characteristics. Further, a particular high capacity retention value of 87.9% was obtained after 500 cycles for the battery B1 incorporating an electrolyte solvent containing 10% by volume of EC.

It has been also found from comparison between the batteries B3 and B4 of the present invention that the battery B3 of the present invention, which incorporates the positive active material having a zirconium (Zr) content of less than 1 mole % with regard to the total mole of Zr and Co, exhibits improved cycle characteristics compared to the battery B4 of the present invention.

The invention claimed is:

1. A nonaqueous electrolyte secondary battery which has a positive electrode containing lithium cobalt oxide as a positive active material, a negative electrode containing a graphite material, and a nonaqueous electrolyte solution containing 10-20% by volume of ethylene carbonate as a solvent, and which is charged with an end-of-charge voltage of at least 4.3 V, said battery being characterized in that a zirconium-containing compound in the form of particles having a particle diameter from 100 nm to 3 μm adheres onto particle surfaces of said lithium cobalt oxide.

2. The nonaqueous electrolyte secondary battery as recited in claim 1, wherein at least 80% of the particle surface of said lithium cobalt oxide is left uncovered.

3. A nonaqueous electrolyte secondary battery which has a positive electrode containing lithium cobalt oxide as a positive active material, a negative electrode containing a graphite material and a nonaqueous electrolyte solution containing 10-20% by volume of ethylene carbonate as a solvent and which is charged with an end-of-charge voltage of at least 4.3 V, said battery being characterized in that said positive active material is a product obtained by firing a mixture of a lithium salt, tricobalt tetraoxide ($Co_3O_4$) and zirconium oxide ($ZrO_2$), and a zirconium compound in the form of particles having a particle diameter from 100 nm to 3 μm adheres onto particle surfaces of said lithium cobalt oxide.

4. The nonaqueous electrolyte secondary battery as recited in claim 3, characterized in that firing of said mixture is performed at a temperature of below 900° C. but not below 700° C.

5. The nonaqueous electrolyte secondary battery as recited in claim 3, characterized in that zirconium is contained in said positive active material in the amount of less than 1 mole % but not less than 0.1 mole %, based on the total mole of cobalt and zirconium.

6. The nonaqueous electrolyte secondary battery as recited in claim 3, wherein at least 80% of the particle surface of said lithium cobalt oxide is left uncovered.

* * * * *